(12) United States Patent
Rival

(10) Patent No.: US 10,958,061 B2
(45) Date of Patent: Mar. 23, 2021

(54) METHOD AND DEVICE FOR PROTECTION FROM INTERNAL ARCS IN AN ELECTRICAL DISTRIBUTION SYSTEM, AND ELECTRICAL CABINET INCLUDING SUCH A DEVICE

(71) Applicant: Schneider Electric Industries SAS, Rueil Malmaison (FR)

(72) Inventor: Marc Rival, Bernin (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 312 days.

(21) Appl. No.: 15/996,559

(22) Filed: Jun. 4, 2018

(65) Prior Publication Data

US 2019/0044317 A1 Feb. 7, 2019

(30) Foreign Application Priority Data

Aug. 3, 2017 (FR) ...................................... 17 57447

(51) Int. Cl.
*H02H 1/00* (2006.01)
*H02H 7/22* (2006.01)

(52) U.S. Cl.
CPC ............ *H02H 1/0023* (2013.01); *H02H 7/22* (2013.01); *H02H 1/0015* (2013.01)

(58) Field of Classification Search
CPC ........................... H02H 1/0015; H02H 1/0023
(Continued)

(56) References Cited

U.S. PATENT DOCUMENTS 5,910,872 A 6/1999 Marmonier et al.
6,229,680 B1 * 5/2001 Shea .................... H02H 1/0023
250/227.11
(Continued)

FOREIGN PATENT DOCUMENTS

CN 103364697 10/2013
CN 105356426 2/2016
(Continued)

OTHER PUBLICATIONS

French Preliminary Search Report dated Mar. 30, 2018, issued in French Application 1757447, filed Aug. 3, 2017 (with English Translation of Categories of Cited Documents & Written Opinion).

*Primary Examiner* — Gary A Nash
(74) *Attorney, Agent, or Firm* — Oblon, McClelland, Maier & Neustadt, L.L.P.

(57) ABSTRACT

A method includes detecting any light beam from 300 nm to 430 nm within the distribution system and, when this beam is detected, generating a signal indicating the presence of an internal arc inside the system; analyzing the characteristics of the light beam based on the signal and, if these characteristics meet required conditions for characterizing an internal arc fault, sending an internal arc fault signal, then; in the presence of an internal arc fault, attenuating its effects in the distribution system. Between the detecting and the analyzing, the visible and infrared portions of this beam are removed, these portions being likely to arise from ionized gases ejected by outlets of a low-voltage circuit breaker interrupting a short-circuit current. A protection device for carrying out this method includes a light detector associated with current-measuring sensors, and protection means including a main circuit breaker, a short-circuiter and a relay.

15 Claims, 2 Drawing Sheets

Figure 1:
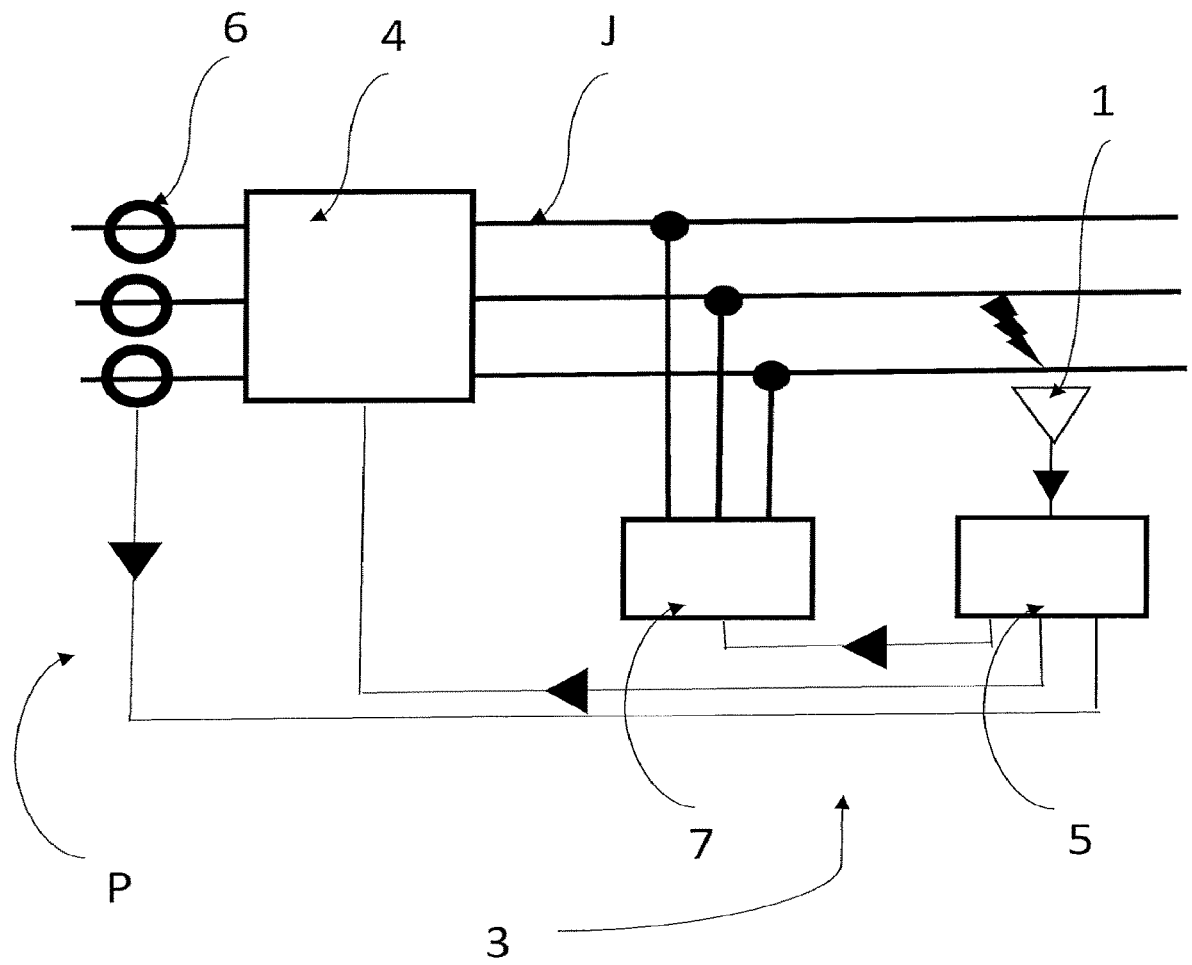

(58) Field of Classification Search
USPC .............................................. 361/2, 42, 91.1
See application file for complete search history.

(56) References Cited

U.S. PATENT DOCUMENTS

| | | | |
|---|---|---|---|
| 8,576,521 B2* | 11/2013 | Rodgers | H02H 1/0023 |
| | | | 361/42 |
| 2005/0122643 A1* | 6/2005 | Shea | H02H 1/0023 |
| | | | 361/42 |
| 2008/0094612 A1 | 4/2008 | Land | |
| 2009/0161272 A1* | 6/2009 | Asokan | G01R 31/1218 |
| | | | 361/43 |
| 2014/0054270 A1* | 2/2014 | Phillips | H02H 1/0023 |
| | | | 218/118 |

FOREIGN PATENT DOCUMENTS

| | | |
|---|---|---|
| DE | 254 278 | 2/1988 |
| DE | 295 02 452 U1 | 6/1996 |
| DE | 38 90 265 | 2/1998 |
| DE | 10 2015 217 633 A1 | 3/2017 |
| EP | 0 853 360 A1 | 7/1998 |
| EP | 1 077 518 A2 | 2/2001 |

* cited by examiner

METHOD AND DEVICE FOR PROTECTION FROM INTERNAL ARCS IN AN ELECTRICAL DISTRIBUTION SYSTEM, AND ELECTRICAL CABINET INCLUDING SUCH A DEVICE

TECHNICAL FIELD

The present invention relates to protection from internal arc faults, in particular in electrical distribution systems such as electrical cabinets. More specifically, the present invention relates to protection devices allowing selective tripping between internal arc faults and short-circuit faults, referred to as "bolted" faults, which are addressed by low-voltage air circuit breakers located downstream of the main circuit breaker.

PRIOR ART

Low-voltage electrical distribution systems include control and protection members such as circuit breakers or low-voltage contactors that are connected to one another by conductors (busbars or cables). The flow of the current through the conductors is interrupted by opening one or more control members, generating an electric arc. When interrupting currents that are equal to or smaller than nominal current, the arcs caused by the interruption are contained by the circuit breakers or the contactors. They emit little light. In the case of larger short-circuit currents, bright light is emitted by these devices and out thereof.

Occasionally, undesirable electric arcs, referred to as internal arc faults, may occur inside electrical cabinets, for example between conductors, or between a conductor and a metal component connected to ground. These arcs may generate high-energy gases, which gases constitute a danger to the structure and personnel located nearby. These arcs generally occur when a mistake is made by a person working in proximity to live parts.

Recently, methods have been developed to minimize the severity of internal arc fault explosions. One of these methods comprises simultaneously measuring the intensity of the light emitted by the fault arc and the intensity of the current passing through the set of busbars upstream of the fault. By combining the two measurements, this method makes it possible to avoid the optical sensors being prematurely triggered by light emitted by other light sources. such as installation inspection lamps, but does not make it possible to distinguish between faults. Specifically, by associating the simultaneous light and current measurements, the risk of a premature trip due to an interfering powerful light beam dazzling the optical sensors is decreased. Along with the simultaneous current measurement, which requires an overload current four times higher than nominal current, for example, to activate the sensor, the risk of a premature trip is greatly decreased.

However, when a low-voltage circuit breaker located downstream of the optical device addresses a "bolted" short-circuit fault, it emits light at the same time as the limited current passes through the circuit. There is then a risk of a premature trip. Now, in this precise case, the activation of the relay for disconnecting the main circuit breaker is not desired, since the fault is addressed by the circuit breaker downstream of the optical device and the installation is not at risk. However, in the event of a fault between the live parts of an installation, it is essential to suppress the arc generated in a very short time so as to protect personnel close to the fault (in a time of less than 3 ms). Such equipment therefore does not make it possible to reliably maintain selectivity between the two circuit breakers, i.e. coordination between the protection devices so that a fault occurring at any point on the network is addressed by the circuit breaker sited immediately upstream of the fault.

SUMMARY OF THE INVENTION

The present invention solves these problems and provides a method and a device for protection from internal arc faults making it possible to distinguish, in a very straightforward manner, between the light arising from an internal arc fault between two conductors, and that arising from ionized gases ejected by the outlets of a low voltage circuit breaker, this distinction making it possible to maintain selectivity between low-voltage protection devices, along with the integrity of the electrical distribution cabinet including such a device.

To this end, the subject of present invention is a method for protection from internal arc faults in an electrical distribution system, comprising the steps consisting in:
  detecting any light beam comprised between 300 and 430 nm within the distribution system and, in the event of the presence of this beam, generating a signal indicating the presence of an internal arc inside the system;
  analysing the characteristics of the aforementioned light beam on the basis of the aforementioned signal and, if these characteristics meet the required conditions for characterizing an internal arc fault, sending an internal arc fault signal, then;
  in the presence of an internal arc fault, its effects in the distribution system are attenuated.

This method is characterized in that, between the aforementioned detection step and the aforementioned analysis step, the visible portion and the infrared portion of this beam are removed, these portions being likely to arise from ionized gases ejected by the outlets of a low-voltage circuit breaker interrupting a short-circuit current.

According to one particular feature, between the aforementioned detection step and the aforementioned analysis step, all light waves of the beam having a wavelength that is strictly higher than 430 nm are blocked.

According to one particular feature, the aforementioned analysis step includes a step of measuring the intensity of the light beam.

Another subject of present invention is a device for protection from internal arc faults in an electrical distribution system, comprising:
  a light detector (1) placed inside the aforementioned distribution system and capable of detecting a light beam comprised between 300 and 430 nm within this system, and of generating a signal indicative of an internal arc inside the system;
  processing means coupled to the aforementioned detector (1) and configured to analyse this light beam on the basis of the aforementioned signal, and to generate a signal indicative of an internal arc fault if the conditions of such a fault are met; and
  electrical protection means (3) configured to receive the arc fault signal and to attenuate the arc in the distribution system.

This device is characterized in that the detector is capable of removing the visible portion and the infrared portion of this light beam, and of generating a signal indicative of the presence of an internal arc propagating through the system in the presence of a portion of the light beam other than the visible or IR portion, referred to as the remaining portion of the beam, and in that the aforementioned processing means are configured to analyse this portion of the beam other than the visible or IR portion, on the basis of the aforementioned signal, and to generate a signal indicative of an internal arc fault if the conditions of such a fault are met.

According to one particular feature, the aforementioned processing means include a means for measuring the intensity of this remaining portion of the light beam.

According to another particular feature, this light detector includes at least one optical sensor or else at least one optical fibre.

According to another particular feature, the or each optical sensor includes at least one photodiode and/or at least one phototransistor, the or each photodiode or phototransistor being provided with a low-pass filter blocking those beams having a wavelength that is higher than 450 nm (+/−20 nm).

According to another embodiment, the or each optical sensor includes at least one photodiode and/or at least one phototransistor, the or each photodiode or phototransistor being provided with a 400 nm (+/−20 nm) bandpass filter.

According to one particular feature, the or each optical fibre is a UV-transmitting optical fibre, and is associated with a 400 nm (+/−20 nm) bandpass filter or with a low-pass optical filter blocking wavelengths that are higher than 450 nm (+/−20 nm).

It will be noted that it is possible to deposit thin films directly on the end of a fibre using an electron beam evaporation system.

Another subject of the present invention is an electrical distribution system including a protection device including the aforementioned features taken individually or in combination.

According to one particular feature, this system comprises a set of busbars, a protection device including the aforementioned features taken individually or in combination, and electrical protection means that are intended to attenuate the effects of a potential internal arc fault inside the system.

According to one particular feature, the aforementioned protection means include a circuit breaker, referred to as the main circuit breaker, supplied with power via the aforementioned set of busbars, a relay capable of receiving measurement information relating both to the light inside the system and to the current flowing through the set of busbars, and a short-circuiter that is electrically linked both to the main circuit breaker and to the relay, said relay being capable of sending, when the threshold value is reached for the two aforementioned measurements, two orders in parallel: an order to activate the short-circuiter, and an order to activate the opening of the main circuit breaker, respectively.

According to another feature, this system further includes at least one low-voltage air circuit breaker located downstream of the light detection device.

According to another feature, this system is a low voltage electrical cabinet.

Figure 2:
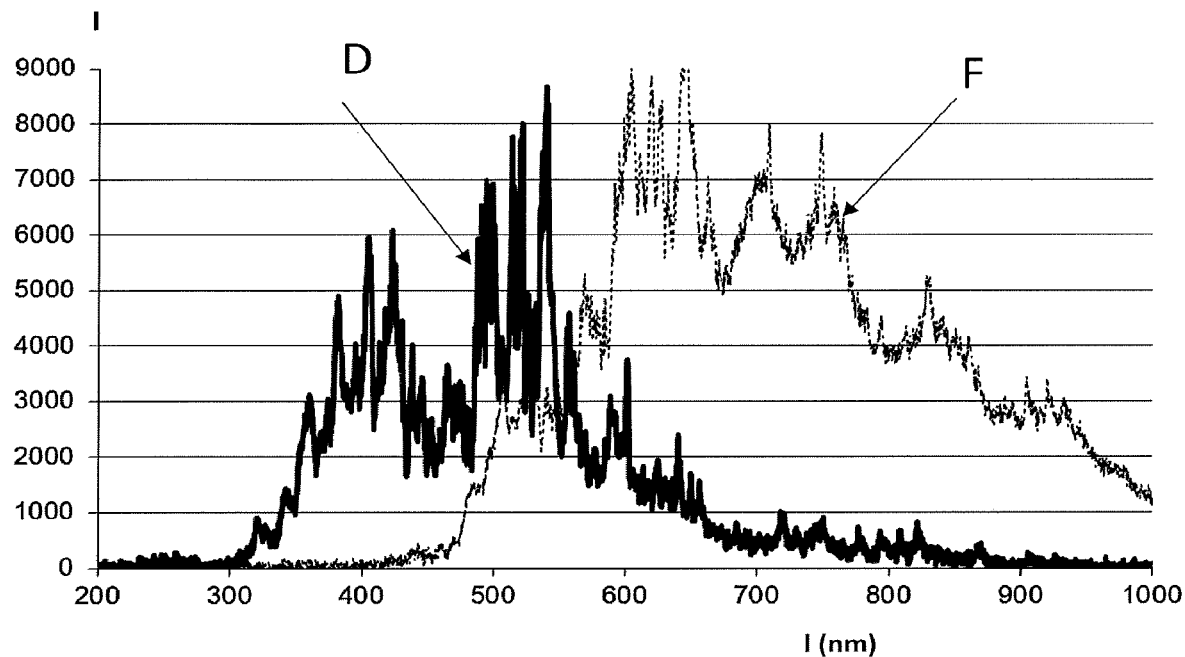
Figure 3:
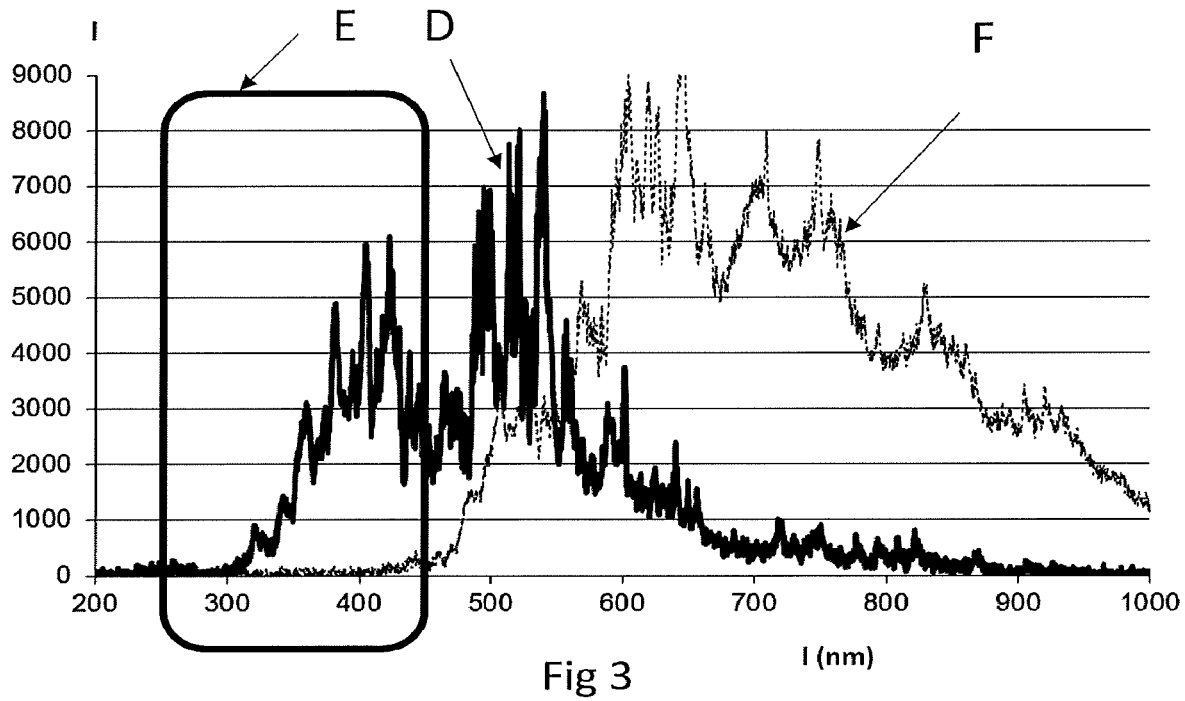

However, other advantages and features of the invention will become more clearly apparent in the detailed description that follows with reference to the appended drawings, which are given solely by way of example and in which:

FIG. 1 is a partial view illustrating a device for protection from electric arcs according to the invention, shown in an electrical cabinet;

FIG. 2 is a graphical representation illustrating the intensity of a light beam as a function of its wavelength, this light beam being generated in the electrical cabinet during the simultaneous presence of an internal arc fault and of a short-circuit interrupted by a low-voltage circuit breaker; and FIG. 3 is the same graphical representation, illustrating the light beam portion detected by the light detector according to the invention.

FIG. 1 shows a device P for electrical protection from internal arc faults, intended to be installed within an electrical distribution system, here an electrical cabinet, housing a set of busbars J, said set of busbars being intended to supply power to or else to electrically link control and/or protection members such as circuit breakers or low-voltage contactors.

This electrical protection device P includes, in a manner known per se, an arc detector including both a light-detecting sensor 1 associated with a current-measuring sensor 6 and electrical protection means 3 that are intended to attenuate the effects of a potential arc fault.

These electrical protection means 3 include a circuit breaker, referred to as the main circuit breaker 4, supplied with power by the aforementioned set of busbars J, a relay 5 capable of receiving information relating both to the light emitted within the distribution system by means of the light detector 1 and to the current flowing through the set of busbars J by means of current sensors 6 placed on the various busbars, along with a short-circuiter 7. This short-circuiter 7 is electrically linked both to the set of busbars J and to the relay 5. The relay is capable of sending, when the threshold value is reached for the two aforementioned measurements relating to light and current, two orders in parallel, one order to activate the short-circuiter 7, and one order to activate the opening of the main circuit breaker 4, respectively.

According to the invention, this light detector 1 includes means for removing the visible portions and infrared portions of the emitted light beam. Advantageously, this light detector 1 includes means for blocking all light waves having a wavelength that is strictly higher than 430 nm.

According to the embodiment illustrated in FIG. 1, this light detector 1 is an optical sensor consisting of a photodiode detecting UV, visible and IR light, this photodiode being provided with a filter blocking wavelengths higher than 450 nm (+/−20 nm).

Other types of sensors could be used, such as, for example, phototransistors provided with wavelength-blocking filters or else bandpass filters.

Thus, for the point sensors, it is possible to envisage providing low-cost standard photodiodes or phototransistors (detecting UV, visible and IR light) with a filter blocking wavelengths that are higher than 450 nm (+/−20 nm) or else a 400 nm (+/−20 nm) bandpass filter.

These optical sensors could also be produced using optical fibres. In this case, it is possible to select optical fibres transmitting UV without attenuation associated with 400 nm (+/−20 nm) bandpass filters or else low-pass optical filters blocking wavelength that are higher than 450 nm (+/−20 nm).

FIGS. 2 and 3 illustrate the spectrum of the light beam present within the distribution system in the presence of both an internal arc fault and a short-circuit fault, these two figures respectively showing the intensity I of the beam as a function of the wavelength I.

In FIGS. 2 and 3, the beam portions F correspond to a light beam generated by the emissions of a low-voltage circuit breaker located downstream of the light sensor and interrupting a short-circuit current, while the beam portions D correspond to the light beam generated by the presence of an internal arc fault within the distribution system.

FIG. 3 illustrates, by means of a box E, the selection made by the light sensor, which takes only those light waves having a wavelength lower than 450 nm into account.

Thus, the method and the device for protection from internal arcs according to the invention make it possible to detect the light generated by an accidental internal arc arising between two live parts of a (two-phase) electrical installation (or an electrical installation having one phase and the neutral) while remaining inactive when the light is generated by the outlet gases of a low-voltage circuit breaker interrupting an electrical fault outside the cabinet.

This is made possible by virtue of a device including for example a sensor or optical fibre configured to remove the visible and IR light and to generate a signal indicative of an arc event propagating inside the cabinet, processing means that are coupled to the sensor and configured to analyse a light property on the basis of the signal sent by the sensor and to generate a signal indicative of an internal arc fault. For example, this light property may be the intensity of the light, which, when it is higher than 8000 lux, would result in a change of state of the relay in order to indicate an internal arc fault.

Lastly, the protection device according to the invention also includes protection means that are configured to receive the internal arc fault signal and to attenuate the effect of the arc in the distribution cabinet.

In operation, the relay receives two items of information; one relating to light, the other relating to current. However, at this stage, the possibility of light being emitted by a circuit breaker is eliminated. If the threshold value is reached for the two measurements relating to light and current, the relay sends two orders in parallel, one to activate the pyrotechnic short-circuiter, the other to activate the opening of the main circuit breaker. The activation of the short-circuiter and the opening of the circuit breaker take place only when there is an internal arc fault.

Thus, the invention allows selective tripping between internal arcs and those generated by low-voltage air circuit breakers.

This method makes it possible both to maintain selectivity of low-voltage protection devices and to protect personnel working in proximity to live conductors.

Specifically, either the device detects an internal arc fault and this fault is addressed by the disconnection made by the main circuit breaker and the short-circuiter, or the fault is a "bolted" short-circuit fault, which will not be detected by the internal arc detector, but will be addressed by the low-voltage circuit breaker located downstream of the internal arc detector.

Of course, the invention is not limited to the embodiments described and illustrated, which have been given only by way of example.

On the contrary, the invention comprises all technical equivalents of the means described and combinations thereof provided that these are implemented according to the spirit of the invention.

The invention claimed is:

1. A method for protecting from internal arc faults in an electrical distribution system, comprising:
   detecting light having a wavelength between 300 and 430 nm emitted from within the electrical distribution system;
   generating, in response to having detected the light having a wavelength between 300 and 430 nm, a presence signal indicating a presence of an internal arc inside the electrical distribution system;
   filtering a visible portion and an infrared portion from the light to produce filtered light;
   analysing characteristics of the filtered light based on the presence signal; and,
   determining whether the characteristics of the filtered light meet a required condition for confirming the internal arc fault;
   sending, in parallel to a main circuit breaker and a short-circuiter, an internal arc fault confirmation signal, when the characteristics of the filtered light meet the required condition for confirming the internal arc fault, to cause the short-circuiter to activate and the main circuit breaker to open.

2. The protection method according to claim 1, wherein said filtering step comprises filtering portions of the light having wavelengths that are strictly higher than 430 nm.

3. The protection method according to claim 1, wherein said analysis step comprises of measuring an intensity of the filtered light.

4. The protection method of claim 3, wherein the determining whether the characteristics of the filtered light meet the required condition comprises determining whether the intensity of the filtered light is greater than a first threshold, and, if so, determining if an amount of current being carried on busbars, connected to the short-circuiter and the main circuit breaker, is greater than a second threshold, and
   wherein the sending comprises sending, in parallel to the main circuit breaker and the short-circuiter, the internal arc fault confirmation signal, when the amount of current being carried on busbars, connected to the short-circuiter and the main circuit breaker, is greater than the second threshold, to cause the short-circuiter to activate and the main circuit breaker to open.

5. A device for protecting from internal arc faults in an electrical distribution system, comprising:
   a light detector placed inside said electrical distribution system and a configured to (a) detect light between 300 and 430 nm within electrical distribution system, and (b) generate a presence signal indicative of an internal arc inside the electrical distribution system;
   a filter configured to filter out a visible portion and an infrared portion from the light to produce filtered light;
   a processor coupled to said filter and configured to (a) analyse the filtered light based said presence signal, and (b) generate an internal arc fault confirmation signal indicative of an internal arc fault if conditions indicating the internal arc fault are met; and
   electrical protection means configured to receive the internal arc fault signal and to attenuate the internal arc in the electrical distribution system by receiving, in parallel at a main circuit breaker and a short-circuiter, the internal arc fault confirmation signal.

6. The protection device according to claim 5, wherein said processor comprises a light detector for measuring an intensity of the filtered light.

7. The protection device according to claim 6, wherein the light detector comprises at least one optical sensor or at least one optical fibre.

8. The protection device according to claim 7, wherein each optical sensor comprises at least one photodiode and/or at least one phototransistor coupled to the filter, and the filter comprises a low-pass filter blocking wavelengths that are higher than 450 nm (+/−20 nm).

9. The protection device according to claim 7, wherein each optical sensor comprises at least one photodiode and/or at least one phototransistor coupled to the filter, and the filter comprises a 400 nm (+/−20 nm) bandpass filter.

10. The protection device according to claim 7, wherein each optical fibre is a UV-transmitting optical fibre coupled to the filter, and wherein the filter comprises at least one of a 400 nm (+/−20 nm) bandpass filter and a low-pass optical filter blocking wavelengths that are higher than 450 nm (+/−20 nm).

11. An electrical distribution system, comprising:
the protection device according to claim 5.

12. The electrical distribution system according to claim 11, comprising at least one low-voltage air circuit breaker located downstream of the light detector.

13. The electrical distribution system according to claim 12, wherein the electrical distribution system is a low voltage electrical cabinet.

14. An electrical distribution system comprising:
a set of busbars J,
the protection device according to claim 5, and
electrical protection means for attenuating the effects of a potential internal arc fault inside the electrical distribution system using the set of busbars J.

15. The electrical distribution system according to claim 14, wherein said electrical protection means comprises, a relay configured to receive measurement information relating both to (a) an intensity of the filtered light inside the system and to the (b) an amount of current flowing through the set of busbars J, wherein the short-circuiter is electrically linked both to the main circuit breaker and to the relay, and
wherein said relay is configured to send, when threshold values are reached for the intensity of the filtered light and the amount of current flowing, two orders in parallel: an order to activate the short-circuiter, and an order to activate the opening of the main circuit breaker, respectively.

* * * * *